United States Patent [19]

Beck et al.

[11] Patent Number: 4,677,882

[45] Date of Patent: Jul. 7, 1987

[54] FEEDING MEANS FOR INTERMITTENTLY ROTATING A CIRCULAR SAW BLADE OF GREAT PITCH

[75] Inventors: Ernst Beck, Maselheim; Peter Lenard, Biberach an der Riss; Hans Hutzel, Ummendorf, all of Fed. Rep. of Germany

[73] Assignee: Vollmer Werke Maschinenfabrik GmbH, Biberach Riss, Fed. Rep. of Germany

[21] Appl. No.: 792,145

[22] Filed: Oct. 28, 1985

[30] Foreign Application Priority Data

Nov. 6, 1984 [DE] Fed. Rep. of Germany ....... 3440500

[51] Int. Cl.⁴ ............................................. B23D 63/14
[52] U.S. Cl. ............................................. 76/77; 76/37
[58] Field of Search ..................... 76/77, 37, 48, 75

[56] References Cited

U.S. PATENT DOCUMENTS 4,018,109  4/1977  Stier ........................................ 76/77

FOREIGN PATENT DOCUMENTS 689015  3/1940  Fed. Rep. of Germany .
3048738  7/1982  Fed. Rep. of Germany .

Primary Examiner—Roscoe V. Parker
Attorney, Agent, or Firm—Burns, Doane, Swecker & Mathis

[57] ABSTRACT

A saw blade supported on a slip-on arbor has a pitch which is greater than the maximum possible stroke of the feeding means. For this reason each individual tooth of the saw blade is pushed in two successive forward strokes, first into an intermediate position by a secondary pawl and then into a working position by a principal pawl. During the advance caused by the secondary pawl the latter is supported at a stop which is formed at a drag lever. The drag lever is pivotable about the slip-on arbor and comprises a guide engaged by a pin. The stop thus moves back and forth on a circular arc about the slip-on arbor causing the secondary pawl to engage a certain location of the tooth face of a tooth or it is advancing.

10 Claims, 5 Drawing Figures

4,677,882

FEEDING MEANS FOR INTERMITTENTLY ROTATING A CIRCULAR SAW BLADE OF GREAT PITCH

BACKGROUND AND OBJECTS OF THE INVENTION

The invention relates to a feeding means for intermittently rotating a circular saw blade of great pitch, comprising a slip-on arbor for the saw blade, a principal pawl designed for strokewise reciprocating motion and such as to push the tooth face of a tooth of the saw blade upon every other forward stroke into a working position, a secondary pawl disposed behind the principal pawl and designed to reciprocate together with the principal pawl and such as to engage behind the tooth face of the next tooth upon each return stroke following the positioning of a tooth and to move said tooth face during the next successive forward stroke into an intermediate position at which the principal pawl may engage behind this tooth face during the subsequent return stroke, and a stop which limits the catch movement of the secondary pawl.

A known feeding means of this kind (DE-PS 689 015) has the secondary pawl supported pivotably on a slide which is guided for displacement in longitudinal direction and adapted to be clamped in position by an attachment screw. The secondary pawl is spring loaded in the direction of its catch movement, the stop limiting this catch movement being formed by a setscrew threaded into the slide. At each defined adjustment of this setscrew, the secondary pawl moves on a drag curve during the movement of advance of the saw blade caused by it, the drag curve depending on the path of movement of the principal pawl taking place simultaneously. It is difficult, and in some cases impossible, to determine this path of movement of the principal pawl and the adjustment of the stop for the secondary pawl such that the secondary pawl will abut invariably at a predetermined location of the respective tooth face it is pushing ahead. Consequently, the secondary pawl travels along the tooth face which thus may become damaged and reach a position at the end of the forward motion of the secondary pawl, not entirely corresponding to the intended intermediate position. Hereby the subsequent catching of the principal pawl may be disturbed.

In another known feeding means for intermittently rotating a circular saw blade (DE-PS 3 048 738) a guide device which is pivotable about the axis of an arbor for a saw blade carries a pawl bearing at an adjustable distance from said axis, a feeding pawl being supported by said bearing. As there is no second feeding pawl, the problems discussed above do not occur.

It is, therefore, an object of the invention to avoid the risk of troubles of the kind described in a feeding means of the kind specified initially.

SUMMARY OF THE INVENTION

This object is met, in accordance with the invention, in that the stop is formed at a drag lever which is pivotable about a pivot bearing, at least approximately coaxial with the slip-on arbor, and connected to the secondary pawl by a guide means extending at least approximately in the direction of the catch movement of the secondary pawl.

In this manner the additional pawl will always abut against the same location of the tooth face during the advance movement it causes, regardless of the path of movement of the principal pawl. Thus the path of movement of the principal pawl may be rendered optimum, disregarding the secondary pawl, for instance, with the aim of the principal pawl reaching the tooth face to be advanced at minimum shock, then accelerating it quickly, and finally retarding the motion such that the respective tooth face comes to a stop exactly at the working position rather than being moved past it by mass moments of inertia.

In a convenient embodiment of the invention the guide means is embodied by a slot formed at the drag lever and engaged by a pin which is fixed to the secondary pawl.

This embodiment may be developed further in that a roller adapted to ride along the tooth back of the saw blade is supported on the pin next to the guide means.

It is further convenient if the pivot bearing comprises a pivot pin and a bearing ring supported on the pivot pin and the drag lever is secured to the bearing ring for adjustment in the direction of the guide means.

This modification of the invention, preferably, is developed further in that the pivot pin is formed at a bearing body adapted to be mounted on the slip-on arbor.

In this context it is convenient if the bearing body comprises holding magnets for positioning with respect to the saw blade.

THE DRAWINGS

The invention will be described further, by way of example, with reference to the accompanying drawings, in which.

DESCRIPTION OF A PREFERRED EMBODIMENT OF THE INVENTION

Figure 1:
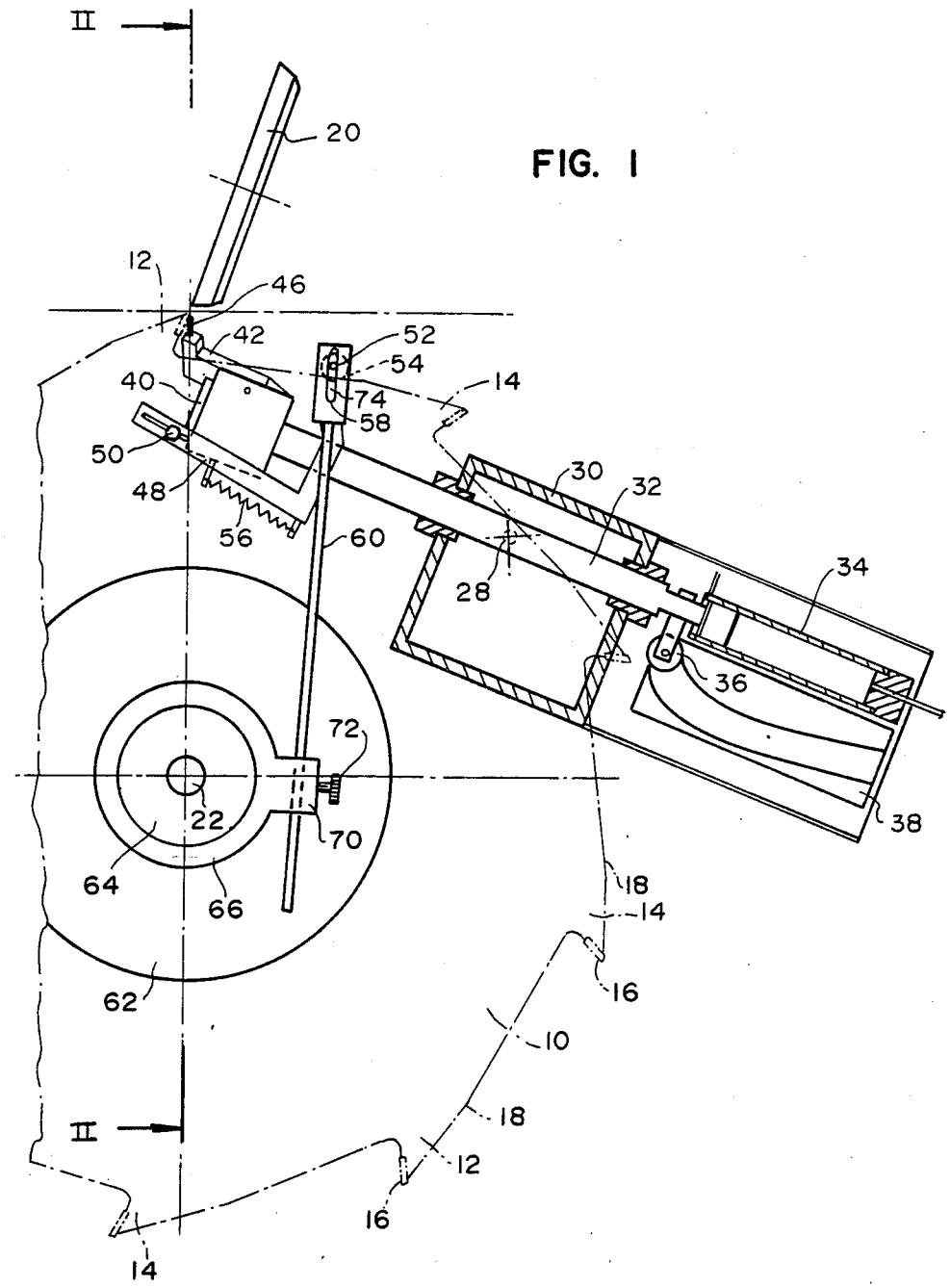
FIG. 1 is a side elevational view of a circular saw blade, shown partly in section parallel to the plane of the saw blade.
Figure 2:
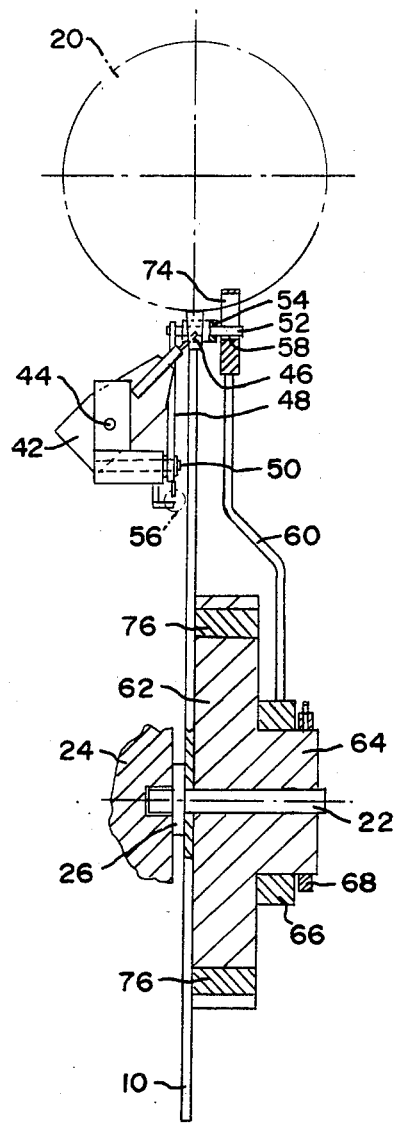
FIG. 2 is the section II—II in FIG. 1.
Figure 3:
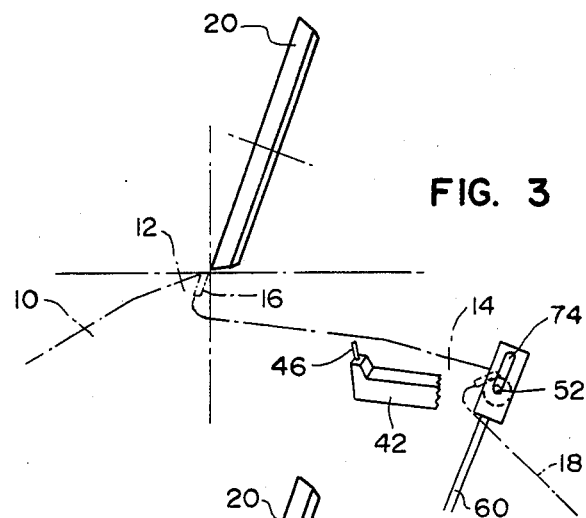
FIGS. 3 to 5 show details of FIG. 1 at different operating positions.

It is the task of the apparatus shown to advance a circular, great pitch saw blade in steps such that a working position adopted by a tooth 12 in accordance with FIGS. 1 and 3 will be occupied by the next successive tooth 14 after two steps. This type of advancing motion has the advantage that each step of the feeding means need only be slightly more than half as big as the tooth pitch. Each tooth 14 again is followed by a tooth 12. In the embodiment shown not only the tooth pitch but also the teeth 12 and 14 are identical. They are marked by different reference numerals only for the purpose of explaining the mode of operation of the feeding means.

Each tooth 12 and 14 has a tooth face 16. In the embodiment shown, the teeth 12 and 14 are to be sharpened by a plate-like grinding disc 20 used for grinding the tooth faces 16. However, the feeding means illustrated may be used also in connection with other types of work.

The saw blade 10 is pushed on a slip-on arbor 22 which is fastened to a carriage 24. The carriage 24 is adjustable in radial direction with respect to the slip-on arbor 22 so as to accommodate saw blades 10 of different diameters. A collar 26 at the slip-on arbor 22 forms a stop to limit the mounting movement of the saw blade 10. The exact axial position of the saw blade 10 during each grinding process is fixed by clamping jaws (not shown) of conventional structure which firmly clamp the saw blade whenever a tooth 12 or 14 is in the working position shown in FIGS. 1 and 3.

The feeding means has an axis 28 which is spaced from and parallel to the slip-on arbor 22. A housing 30 is pivotable about this axis. In the housing 30 a piston rod 32 is guided for displacement with its geometric axis intersecting the axis 28 at right angles. The piston rod 32 forms part of a double-acting piston and cylinder unit 34 and is linked by a parallel rod (not shown) to a cam follower roller 36 guided at a stationary cam 38. The cam 38 is exchangeable for adaptation to saw blades of different sizes.

A pawl carrier 40 is fixed to an end of the piston rod 32 and in turn supports a principal pawl 42 for pivoting about a main pawl axis 44. The principal pawl 42 carries a pin 46 for engagement with the tooth face 16 of a tooth 12 or 14 so as to push the same ahead. A spring (not shown) biases the principal pawl 42 in the direction toward the saw blade 10.

Likewise supported on the pawl carrier 40 is a secondary pawl 48 adapted to pivot about an auxiliar pawl axis 50 parallel to the slip-on arbor 22. The secondary pawl 48 also has a pin 52 which, however, does not contact the saw blade 10 directly but instead by way of a roller 54. This roller is supported on the pin and during each return stroke of the piston and cylinder unit 34, to the right in FIGS. 1 to 5, it is adapted to ride along the tooth back 18 of a tooth 12 or 14 for subsequent engagement behind the tooth face 16 of the same tooth.

Engagement of the secondary pawl 48 may be by gravity. However, in the embodiment illustrated it is enhanced by a spring 56 inserted between the pawl carrier 40 and the secondary pawl 48 on which it exerts a torque in counterclockwise sense, as seen in FIGS. 1 and 3 to 5. The catch movement of the secondary pawl 48 is limited by a stop 58 formed at a drag lever 60.

The drag lever 60 is pivotable back and forth about the slip-on arbor 22. To this end a bearing body 62 is pushed on the slip-on arbor 22 in addition to the saw blade 10. The bearing body is formed with a pivot pin 64 which is coaxial with the slip-on arbor 22 and thus also with the saw blade 10. The pivot pin 64 supports a bearing ring 66 which is fixed axially by a retaining ring 68. The bearing ring 66 is formed with a clamping member 70 in which the drag lever 60 is guided for adjustment in longitudinal direction and so as to be secured by a clamping screw 74. The drag lever 60 comprises a guide means 74 in the form of a slot or an oblong hole the lower end of which, as seen in drawing, being the radially inner end with respect to the slip-on arbor 22 forms the stop 58 for the pin 52 engaging in the guide means 74.

The bearing body 62 is retained at the saw blade 10 by built-in holding magnets 76 and is used in conventional manner to grip the saw blade when the latter is slipped on the arbor 22 or to be pulled off the same. The bearing ring 66 and the drag lever 60 are removed with ease upon loosening of the retaining ring 68 when work is to be done on a saw blade having a smaller pitch than the stroke available of the piston and cylinder unit 34. In this case also the secondary pawl 48 is disassembled.

However, if the tooth pitch of the saw blade 10 is greater than the maximum stroke of the piston and cylinder unit 34, as shown, the device operates as follows:

It is assumed that the piston and cylinder unit 34 and thus also the pawl carrier 40 have finished a forward stroke, as shown in FIG. 1, during which the principal pawl 42 has moved a tooth 12 into its working position.

Now the saw blade 10 is clamped in position and the tooth 12 is subjected to work at its face 16 while the piston and cylinder unit 34 carries out a backward stroke. During this backward stroke the roller 54 rides on the tooth back 18 of the next successive tooth 14 and finally snaps into engagement behind the tooth face 16 thereof, as shown in FIG. 3. The terminal position of the catch movement is determined by the stop 58.

Figure 4:
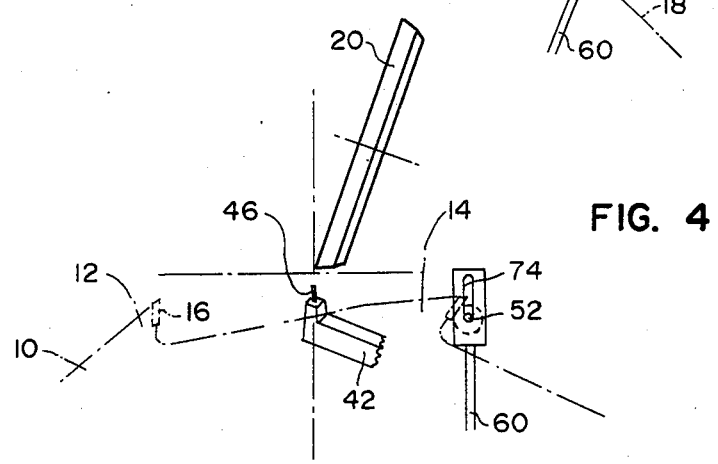
Figure 5:
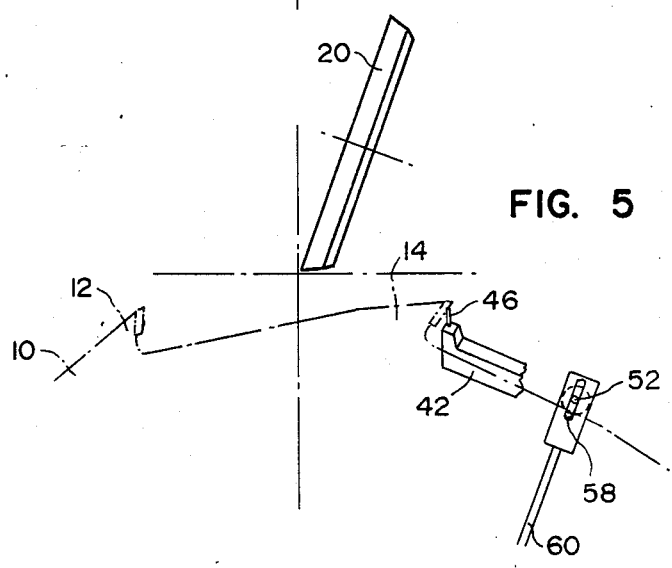

During the next foward stroke the roller 54 of the secondary pawl 48 pushes the tooth 14 into an intermediate position in accordance with FIG. 4. At the same time the principal pawl 42 is inactive and does not engage behind the tooth 14 until the next return stroke is finished, as shown in FIG. 5. During the next forward stroke this tooth then is advanced by the principal pawl 42 from the intermediate position according to FIG. 5 into the working position shown in FIG. 1.

What is claimed is:

1. A feeding means for intermittently rotating a circular saw blade of great pitch, comprising
   a slip-on arbor for the saw blade,
   a principal pawl designed for strokewise reciprocating motion such as to push the tooth face of a tooth of the saw blade upon every other forward stroke into a working position,
   a secondary pawl disposed behind the principal pawl and designed to reciprocate together with the principal pawl such as to engage behind the tooth face of the next tooth upon each return stroke following the positioning of a tooth and to move said tooth face during the next successive forward stroke into an intermediate position at which the principal pawl may engage behind this tooth face during the subsequent return stroke, and
   a stop which limits the movement of the secondary pawl,
   characterized in that the stop is formed at a drag lever which is pivotable about a pivot bearing, at least approximately coaxial with the slip-on arbor, and connected to the secondary pawl by a guide means extending at least approximately in the direction of the movement of the secondary pawl.

2. The feeding means as claimed in claim 1, characterized in that the guide means is a slot formed at the drag lever and engaged by a pin which is fixed to the secondary pawl.

3. The feeding means as claimed in claim 2, characterized in that a roller adapted to ride along the tooth backs of the saw blade is supported on the pin next to the guide means.

4. The feeding means as claimed in claim 1, characterized in that the pivot bearing comprises a pivot pin and a bearing ring supported on the pivot pin and the drag lever is secured to the bearing ring for adjustment in the direction of the guide means.

5. The feeding means as claimed in claim 4, characterized in that the pivot pin is formed at a bearing body adapted to be mounted on the slip-on arbor.

6. The feeding means as claimed in claim 5, characterized in that the bearing body comprises holding magnets for positioning with respect to the saw blade.

7. The feeding means as claimed in claim 2, characterized in that the pivot bearing comprises a pivot pin and a bearing ring supported on the pivot pin and the drag lever is secured to the bearing ring for adjustment in the direction of the guide means.

8. The feeding means as claimed in claim 3, characterized in that the pivot bearing comprises a pivot pin and a bearing ring supported on the pivot pin and the drag lever is secured to the bearing ring for adjustment in the direction of the guide means.

9. The feeding means as claimed in claim 7, characterized in that the pivot pin is formed at a bearing body adapted to be mounted on the slip-on arbor.

10. The feeding means as claimed in claim 8, characterized in that the pivot pin is formed at a bearing body adapted to be mounted on the slip-on arbor.

* * * * *